United States Patent
Assarpour

(10) Patent No.: US 8,804,507 B2
(45) Date of Patent: Aug. 12, 2014

(54) METHOD AND APPARATUS FOR TEMPORAL-BASED FLOW DISTRIBUTION ACROSS MULTIPLE PACKET PROCESSORS

(75) Inventor: Hamid Assarpour, Arlington, MA (US)

(73) Assignee: Avaya, Inc., Basking Ridge, NJ (US)

( * ) Notice: Subject to any disclaimer, the term of this patent is extended or adjusted under 35 U.S.C. 154(b) by 474 days.

(21) Appl. No.: 13/077,577

(22) Filed: Mar. 31, 2011

(65) Prior Publication Data

US 2012/0250692 A1 Oct. 4, 2012

(51) Int. Cl.
| | |
|---|---|
| G08C 15/00 | (2006.01) |
| H04L 12/28 | (2006.01) |
| G06F 15/16 | (2006.01) |
| G06F 15/173 | (2006.01) |
| G06F 3/00 | (2006.01) |
| G06F 9/34 | (2006.01) |
| H04L 12/56 | (2006.01) |
| H04L 12/54 | (2013.01) |
| G06F 17/30 | (2006.01) |
| G06F 5/06 | (2006.01) |

(52) U.S. Cl.
CPC ............ H04L 47/10 (2013.01); H04L 12/5695 (2013.01); H04L 49/90 (2013.01); G06F 17/30949 (2013.01); G06F 5/06 (2013.01)
USPC ........ 370/230; 370/252; 370/395.2; 370/412; 709/232; 709/238; 710/29; 710/52; 711/216

(58) Field of Classification Search
CPC ....... H04L 47/10; H04L 47/30; H04L 12/569; H04L 12/5695; H04L 45/00; H04L 49/90; G06F 5/06; G06F 5/10; G06F 17/30949; G06F 17/30952
USPC ...................... 370/394, 230, 252, 395.2, 412; 709/232, 238; 710/29, 52; 711/216
See application file for complete search history.

(56) References Cited

U.S. PATENT DOCUMENTS

| 7,565,349 | B2 * | 7/2009 | Beckerle et al. ..................... 1/1 |
|---|---|---|---|
| 8,295,177 | B1 * | 10/2012 | Bharghavan et al. ......... 370/235 |
| 2005/0147034 | A1 * | 7/2005 | Zhao et al. .................... 370/229 |
| 2006/0239283 | A1 * | 10/2006 | Fitzgerald ..................... 370/401 |
| 2007/0106666 | A1 * | 5/2007 | Beckerle et al. .................. 707/7 |
| 2007/0286194 | A1 * | 12/2007 | Shavitt et al. ................. 370/392 |
| 2009/0185575 | A1 * | 7/2009 | Iwata et al. ................... 370/422 |
| 2010/0118885 | A1 * | 5/2010 | Congdon ...................... 370/419 |
| 2011/0013519 | A1 * | 1/2011 | Chang et al. .................. 370/241 |

\* cited by examiner

*Primary Examiner* — Alpus H Hsu
*Assistant Examiner* — Dharmesh Patel
(74) *Attorney, Agent, or Firm* — Anderson Gorecki & Rouille LLP

(57) ABSTRACT

A method, apparatus and computer program product for temporal-based flow distribution across multiple packet processors is presented. A packet is received and a hash identifier (ID) is computed for the packet. The hash ID is used to index into a State Table and to retrieve a corresponding record. When a time credit field of the record is zero then the time credit field is set to a to a new value; a Packet Processing Engine (PE) whose First-In-First-Out buffer (FIFO) has the lowest fill level is selected; and a PE number field in the state table record is updated with the selected PE number. When the time credit field of the record is non-zero then the packet is sent to a PE based on the value stored in the record; and the time credit field in the record is decremented if the time credit field is greater than zero.

17 Claims, 4 Drawing Sheets

METHOD AND APPARATUS FOR TEMPORAL-BASED FLOW DISTRIBUTION ACROSS MULTIPLE PACKET PROCESSORS

BACKGROUND

In modern telecommunications networks, information (voice, video, data) is transferred as packet data. The processing of these packets has resulted in the creation of devices referred to as packet processors (also referred to herein as network processors) that are optimized to deal with this form of packet data. Network Processors have specific features or architectures that are provided to enhance and optimize packet processing within these networks. Network processors are programmable and thus allow a single hardware design to undertake a number of different functions, where the appropriate software is installed.

In the generic role as a packet processor, a number of optimized features or functions are typically present in a network processor. These include pattern matching which refers to the ability to find specific patterns of bits or bytes within packets in a packet stream. Another feature is key lookup, for example address lookup—which is the ability to quickly undertake a database lookup using a key (typically an address on a packet) to find a result, typically routing information. Additionally, packet processors perform queue management. As packets are received, processed and scheduled to be sent onwards, they are stored in queues.

In order to deal with high data-rates, several architectural paradigms have been commonly used. These include the pipelining of packet processors wherein each stage of the pipeline consists of an entire processor performing one of the functions described above. Also used is parallel processing with multiple processors, often including multithreading. Network link bandwidth has scaled from 10 Mega bits per second (Mbps), 100 Mbps, 1 Gigabit per second (Gbps), 10 Gbps, and now to the next generation 40 Gbps and 100 Gbps technologies which requires faster processing of packets.

SUMMARY

Conventional mechanisms such as those explained above suffer from a variety of deficiencies. One such deficiency with conventional packet processing is that the packet rates at 40/100 Gbps speeds create a challenging task in the design of packet processors. Since there are no applications or endpoint devices (such as servers and storage) which currently are capable of generating a single m-tuple flow at these high rates, one alternative is to have 'n' packet processors with each handling 1/n of the input rate 'r'.

There are two common solutions to this problem, namely the use of flow hashing, and the use of sequence numbers. It is well known that pure flow hashing does not result in an even bandwidth distribution over short time periods. Flow hashing requires very large packet buffers and even then loss-less behavior is not guaranteed. The sequence number method tries to load balance across the packet processors without regards to the packet order. It tags each packet with a sequence number. At the merge point where the packets from the output of all packet processors are collected, it maintains a single reorder queue where the sequence number is used to put the packets back in order again. The shortcomings with this method are longer latencies due to single reorder queue and complexity due to missing sequence number when packets are discarded within a packet processor, and duplicated sequence numbers when a packet processor makes copies of packets for applications such as mirroring and multicasting.

Embodiments of the invention significantly overcome such deficiencies and provide mechanisms and techniques that provide temporal-based flow distribution across multiple packet processors. The input bandwidth is distributed evenly across all packet processors and packet order is preserved within each flow. If the distribution is not fair, it would eventually result in over-subscription of some of the packet processors and packet loss.

In a particular embodiment of a method for providing temporal-based flow distribution across multiple packet processors, the method begins by receiving a packet and computing a hash identifier (ID) for the packet. The method further includes using the hash ID to index into a State Table and retrieving a corresponding record. When the time credit field of the record is zero, then the method performs the steps of setting the time credit field to a new value, selecting a Packet Processing Engine (PE) whose First-In-First-Out buffer (FIFO) has the lowest fill level, and updating a PE number field in the state table record with selected PE number. When the time credit field of the record is non-zero, the method performs the steps of sending the packet to a PE based on the value stored in the record, and decrementing the time credit field in the record only if the time credit field is greater than zero.

Other embodiments include a computer readable medium having computer readable code thereon for providing temporal-based flow distribution across multiple packet processors. The computer readable medium includes instructions for receiving a packet and computing a hash identifier (ID) for the packet. The computer readable medium further includes instructions for using the hash ID to index into a State Table and retrieving a corresponding record. The computer readable medium further includes instructions wherein when the time credit field of the record is zero, then setting the time credit field to a new value, selecting a Packet Processing Engine (PE) whose First-In-First-Out buffer (FIFO) has the lowest fill level, and updating a PE number field in the state table record with selected PE number. The computer readable medium also includes instructions wherein when the time credit field of the record is non-zero, sending the packet to a PE based on the value stored in the record, and decrementing the time credit field in the record only if the time credit field is greater than zero.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides temporal-based flow distribution across multiple packet processors as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing temporal-based flow distribution across multiple packet processors as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

This presently described method and apparatus for providing flow distribution across multiple packet processors uses a temporal-based flow distribution to guarantee both fair distribution of bandwidth across packet processors and packet order within m-tuple flows. The described flow distribution methodology takes advantage of the fact that the average m-tuple flow bandwidth is at least an order of magnitude less than the high speed link bandwidth (such as 40/100 Gbps links), and that the average inter-packet arrival time within an m-tuple flow is larger than the packet processing latency.

The flow distribution technique attempts on a temporal basis to assign flows to the least loaded packet processors. It keeps track of class/group of flows that are assigned to a particular packet processor. In the background these flows are aged out if the inter-packet arrival time is longer than the age timer. The age timer is set to the worst-case packet processor latency time. If the inter-packet time is shorter than the age timer, the age timer does not age out the flow. For instance, a packet flow is initially assigned to a first packet processor. If the flow times out before the next packet in that flow, then the flow is assigned to another packet processor which has the lowest load. The packet order within the flow is preserved since the age timer mechanism guarantees the previous packets in that flow have already exited the packet processor. Over short periods of time, many flows migrate from one packet processor to others based on processing load; thus, providing a balanced bandwidth distribution across all packet processors. It is important to note that one major difference with the common hashing methods is that once a flow is hashed to a packet processor, it will stick to it indefinitely. In this method, the same flow as long as it is aged out can be switched to different packet processor with a least load.

The technique uses the following functional blocks: a Flow Distributor (FD) which feeds n FIFO/PE (first In First Out/Packet Processing Engine) pairs where each FIFO sits between the FD and its corresponding PE. The output of all PE's is collected by a merge function which sends packets to the output port.

Figure 1:
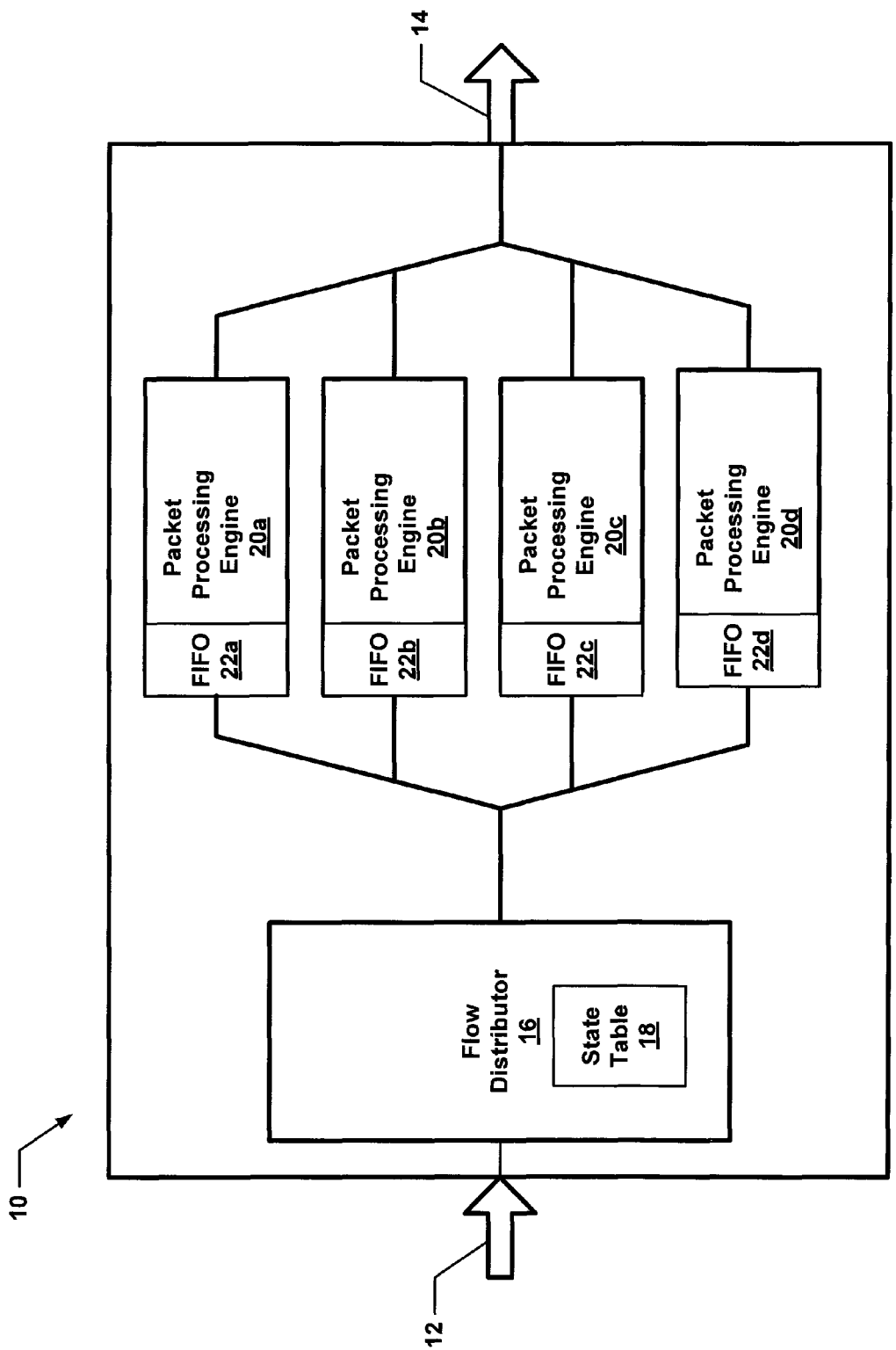
FIG. 1 illustrates an example computer system architecture for a packet processing system that performs temporal-based flow distribution across multiple packet processors in accordance with embodiments of the invention.

Referring now to FIG. 1, a system 10 is shown for performing temporal-based flow distribution across multiple packet processors. System 10 includes a flow distributor 16, having a an input port 12 for receiving packets, and an output coupled to a plurality of Packet Processing Engines 22a-22b. The outputs of the PEs 22a-22d are merged and sent out output port 14. As packets are received from the input port 12, they are sent to the FD 16. The FD 16 uses both m-tuple flow hashing and a State Table 18 to assign flows to a least loaded PE. The FD's function is to distribute packets across the PE's in such a way that satisfies two criteria: fair bandwidth distribution, and maintaining packet order within flows as received from the input port. Each PE 20a-20d is fed by a respective FIFO 22a-22d. Note that the instantaneous input rate to each FIFO is 'r' (input port rate) and the sustained output rate is r/n where n is the number of PEs. Each FIFO 22a-22d dynamically provides its fill level to the FD 16. The technique assumes that each PE 20a-20d can process packets at r/n rate at all packet sizes. Therefore, as long as the offer load does not sustain above the r/n rate, the PE is not oversubscribed and it only adds processing latency. The FIFO functions as a transitory burst buffer and as a mechanism to gauge the load on its corresponding PE.

The FD 16 maintains a State Table 18. Each record (or entry) in the state table 18 includes at least two fields: a time credit field and a PE number or ID field. One key feature of this invention is that the FD 16 does not store the m-tuple flow information in the hash table or any other table. This technique requires much less memory as compared to solutions that are based on flow-based hash table.

The FD 16 performs the following operations for every packet that it receives from the input port 12 to provide fair bandwidth distribution across PE's 20a-20d and packet order within a flow. The FD 16 will compute a hash id based on m fields within the packet. The FD 16 uses the hash id to index into the state table 18 and fetch the corresponding record. When the record's time credit field is zero, then the FD 16 will set the time credit to the maximum value and select a PE whose FIFO has the lowest fill level. The FD 16 will also update the PE number field in the state table record with selected PE number. When the record's time credit field is non-zero, then FD 16 will send the packet to the PE based on the value stored in the record, and decrements the time credit field in the record only if it is greater than zero.

A flow chart of a particular embodiment of the presently disclosed method for performing temporal-based flow distribution is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 2A:
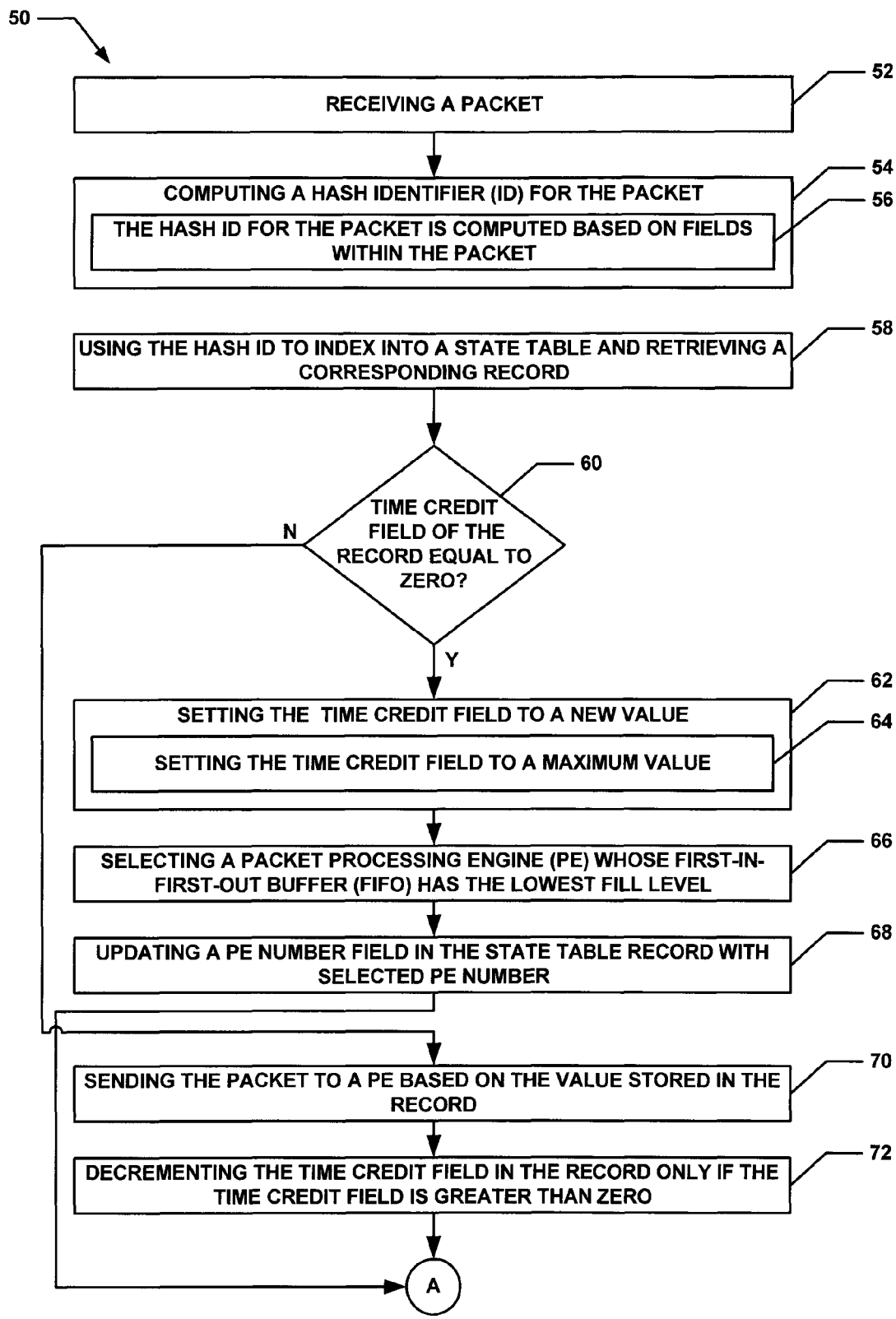
FIGS. 2A and 2B depict a flow diagram of a particular method for performing temporal-based flow distribution across multiple packet processors in accordance with embodiments of the invention.
Figure 2B:
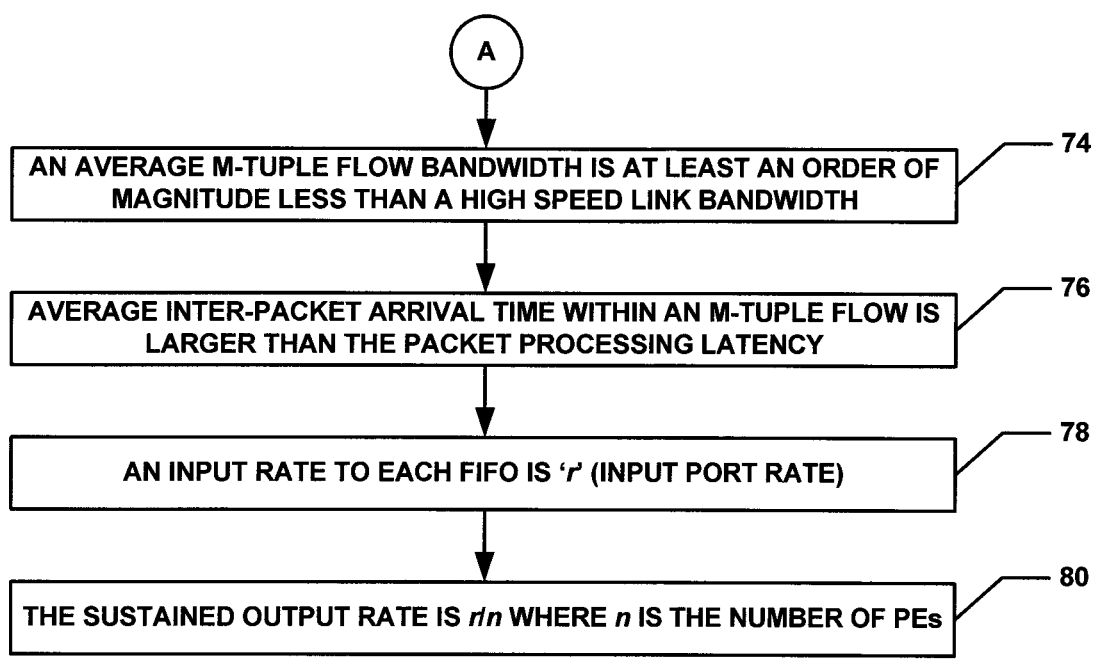

Referring now to FIGS. 2A and 2B, a particular embodiment of a method 50 for providing temporal-based flow distribution across multiple packet processors is shown. Method 50 begins with processing block 52 which discloses receiving a packet. As packets are received from the input port, they are sent to the FD. The FD's function is to distribute packets across the PE's in such a way that satisfies two criteria: fair bandwidth distribution, and maintaining packet order within flows as received from the input port.

Processing block 54 states computing a hash identifier (ID) for the packet. As shown in processing block 56, the hash ID for the packet is computed based on fields within the packet.

Processing block 58 recites using the hash ID to index into a State Table and retrieving a corresponding record. The record contains a time credit field and a PE number field. The FD does not store the m-tuple flow information in the hash table or any other table. This technique requires much less memory as compared to solutions that are based on flow-based hash table.

Decision block 60 determines whether a time credit field of the record is equal to a zero value. When the time credit field of the packet is equal to a zero value then processing continues with processing block 62 which discloses setting the time credit field to a new value. As shown in processing block 64, this comprises setting the time credit field to a maximum value.

Processing block 66 discloses selecting a Packet Processing Engine (PE) whose First-In-First-Out buffer (FIFO) has the lowest fill level. A Flow Distributor (FD) feeds n FIFO/PE (first In First Out/Packet Processing Engine) pairs where each FIFO sits between the FD and its corresponding PE. The output of all PE's is collected by a merge function which sends packets to the output port. Processing block 68 states updating a PE number field in the state table record with selected PE number.

Referring back to decision block 60, when the time credit field of the packet is equal to a zero value then processing continues with processing block 70 which recites sending the packet to a PE based on the value stored in the record. Processing block 72 states decrementing the time credit field in the record only if the time credit field is greater than zero.

Upon completion of processing block 68 or completion of processing block 72, processing continues with processing block 74 which discloses the average m-tuple flow bandwidth is at least an order of magnitude less than a high speed link bandwidth. Processing block 76 states an average inter-packet arrival time within an m-tuple flow is larger than the packet processing latency.

Processing block 78 recites wherein an input rate to each FIFO is 'r' (input port rate) and processing block 80 discloses wherein the sustained output rate is r/n where n is the number of PEs. Each FIFO dynamically provides its fill level to the FD. The technique assumes that each PE can process packets at r/n rate at all packet sizes. Therefore, as long as the offer load does not sustain above the r/n rate, the PE is not oversubscribed and it only adds processing latency.

Figure 3:
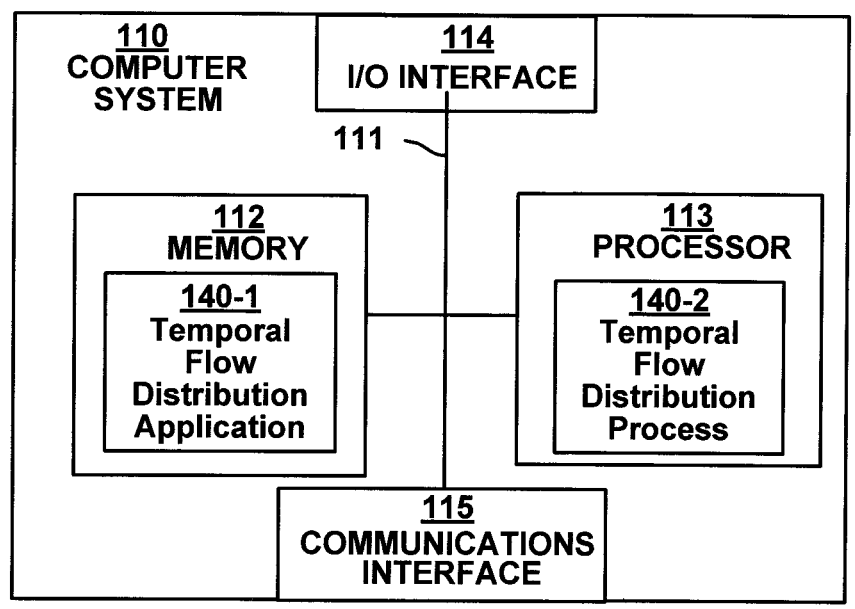
FIG. 3 illustrates an example flow distributor of a packet processing system used in performing temporal-based flow distribution across multiple packet processors in accordance with embodiments of the invention.

FIG. 3 is a block diagram illustrating example architecture of a computer system 110 that executes, runs, interprets, operates or otherwise performs a temporal flow distribution application 140-1 and temporal flow distribution process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the temporal flow distribution application 140-1 and process 140-2 provides on the display 130. Essentially, the graphical user interface 160 is where the customer 108-1 performs their 'online banking', specifying which bills are to be paid electronically, when those bills are to be paid, and the amount to be paid. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a temporal flow distribution application 140-1 as explained herein. The temporal flow distribution application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a temporal flow distribution application 140-1. Execution of a temporal flow distribution application 140-1 in this manner produces processing functionality in the temporal flow distribution process 140-2. In other words, the temporal flow distribution process 140-2 represents one or more portions or runtime instances of a temporal flow distribution application 140-1 (or the entire a temporal flow distribution application 140-1) performing or executing within or upon the processor 113 in the computerized device 110 at runtime.

It is noted that example configurations disclosed herein include the temporal flow distribution application 140-1 itself (i.e., in the form of un-executed or non-performing logic instructions and/or data). The temporal flow distribution application 140-1 may be stored on a computer readable medium (such as a floppy disk), hard disk, electronic, magnetic, optical, or other computer readable medium. A temporal flow distribution application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a temporal flow distribution application 140-1 in the processor 113 as the temporal flow distribution process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the temporal flow distribution application 140-1. Execution of temporal flow distribution application 140-1 produces processing functionality in temporal flow distribution process 140-2. In other words, the temporal flow distribution process 140-2 represents one or more portions of the temporal flow distribution application 140-1 (or the entire application) performing within or upon the processor 113 in the computer system 100.

It should be noted that, in addition to the temporal flow distribution process 140-2, embodiments herein include the temporal flow distribution application 140-1 itself (i.e., the un-executed or non-performing logic instructions and/or data). The temporal flow distribution application 140-1 can be stored on a computer readable medium such as a floppy disk, hard disk, or optical medium. The temporal flow distribution application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of temporal flow distribution application 140-1 in processor 113 as the temporal flow distribution process 140-2. Those skilled in the art will understand that the computer system 100 can include other processes and/or software and hardware components, such as an operating system that controls allocation and use of hardware resources associated with the computer system 100.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD- ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   receiving a packet as part of an m-tuple flow, wherein m is a non-zero value indicating a number of tuples;
   computing a hash identifier (ID) for said packet;
   using said hash ID to index into a State Table and retrieving a corresponding record, wherein said record includes a time credit field and a Packet Processing Engine (PE) number and does not include m-tuple flow information; and
   when a time credit field of said record is zero then:
      setting said time credit field to a new value;
      selecting the Packet Processing Engine whose First-In-First-Out buffer (FIFO) has the lowest fill level; and
      updating a PE number field in the state table record with the selected PE number; and
   when the time credit field of said record is non-zero then:
      sending the packet to the PE based on the value stored in said record; and
      decrementing said time credit field in the record only if said time credit field is greater than zero.

2. The method of claim 1, wherein said setting said time credit field to a new value comprises setting said time credit field to a maximum value.

3. The method of claim 1, wherein an average m-tuple flow bandwidth is at least an order of magnitude less than a high speed link bandwidth.

4. The method of claim 1, wherein average inter-packet arrival time within said m-tuple flow is larger than the packet processing latency.

5. The method of claim 1, wherein an input rate to each FIFO is 'r', wherein r is an input port rate.

6. The method of claim 5, wherein a sustained output rate is r/n where n is the number of PEs.

7. The method of claim 1, wherein said using a time credit field to determine which packet processing engine is used provides fair bandwidth distribution and packet order within a flow.

8. A non-transitory computer readable storage medium having computer readable code thereon for temporal-based flow distribution across multiple packet processors, the medium including instructions in which a computer system performs operations comprising:
   receiving a packet as part of an m-tuple flow, wherein m is a non-zero value indicating a number of tuples;
   computing a hash identifier (ID) for said packet;
   using said hash ID to index into a State Table and retrieving a corresponding record wherein said record includes a time credit field and a Packet Processing Engine (PE) number and does not include m-tuple flow information; and
   when a time credit field of said record is zero then:
      setting said time credit field to a new value;
      selecting the Packet Processing Engine whose First-In-First-Out buffer (FIFO) has the lowest fill level; and
      updating a PE number field in the state table record with selected PE number; and
   when the time credit field of said record is non-zero then:
      sending the packet to the PE based on the value stored in said record; and
      decrementing said time credit field in the record only if said time credit field is greater than zero.

9. The non-transitory computer readable storage medium of claim 8, wherein said setting said time credit field to a new value comprises setting said time credit field to a maximum value.

10. The non-transitory computer readable storage medium of claim 8, wherein an average m-tuple flow bandwidth is at least an order of magnitude less than a high speed link bandwidth.

11. The non-transitory computer readable storage medium of claim 8, wherein average inter-packet arrival time within an m-tuple flow is larger than the packet processing latency.

12. The non-transitory computer readable storage medium of claim 8, wherein an input rate to each FIFO is 'r', wherein r is an input port rate.

13. The non-transitory computer readable storage medium of claim 12, wherein a sustained output rate is r/n where n is the number of PEs.

14. The non-transitory computer readable storage medium of claim 8, wherein said using a time credit field to determine which packet processing engine is used provides fair bandwidth distribution and packet order within a flow.

15. A computer system comprising a flow distributor and a plurality of Packet Processing Engines (PEs), each of said flow distributor and said PEs comprising:
   a memory;
   a processor;
   a communications interface;
   an interconnection mechanism coupling the memory, the processor and the communications interface; and
   wherein the memory is encoded with an application providing for temporal-based flow distribution across multiple packet processors, that when performed, provides a process for processing information, the process causing the computer system to perform the operations of:
      receiving a packet as part of an m-tuple flow, wherein m is a non-zero value indicating a number of tuples;
      computing a hash identifier (ID) for said packet;
      using said hash ID to index into a State Table and retrieving a corresponding record wherein said record includes a time credit field and a Packet Processing Engine (PE) number and does not include m-tuple flow information; and
      when a time credit field of said record is zero then:
         setting said time credit field to a new value;
         selecting the Packet Processing Engine whose First-In-First-Out buffer (FIFO) has the lowest fill level; and
         updating a PE number field in the state table record with selected PE number; and
      when the time credit field of said record is non-zero then:
         sending the packet to the PE based on the value stored in said record; and
         decrementing said time credit field in the record only if said time credit field is greater than zero.

16. The computer system of claim 15, wherein average inter-packet arrival time within an m-tuple flow is larger than a packet processing latency.

17. The computer system of claim 15, wherein said using a time credit field to determine which packet processing engine is used provides fair bandwidth distribution and packet order within a flow.

* * * * *